(12) United States Patent
Delapierre et al.

(10) Patent No.: US 8,573,944 B2
(45) Date of Patent: Nov. 5, 2013

(54) ANTI-WEAR DEVICE OF A TURBOMACHINE ROTOR

(75) Inventors: Michael Delapierre, Paris (FR); Jerome Paul Marceau Mace, Cesson (FR); Patrick Jean-Louis Reghezza, Vaux le Penil (FR); Nicolas Christian Triconnet, Bruges (FR)

(73) Assignee: SNECMA, Paris (FR)

( * ) Notice: Subject to any disclaimer, the term of this patent is extended or adjusted under 35 U.S.C. 154(b) by 633 days.

(21) Appl. No.: 12/845,397

(22) Filed: Jul. 28, 2010

(65) Prior Publication Data

US 2011/0027093 A1  Feb. 3, 2011

(30) Foreign Application Priority Data

Jul. 28, 2009 (FR) ...................................... 09 03695

(51) Int. Cl.
*F01D 5/10* (2006.01)
(52) U.S. Cl.
USPC ............................................................ 416/221
(58) Field of Classification Search
USPC ........... 416/219 A, 219 R, 220 A, 220 R, 221
See application file for complete search history.

(56) References Cited

U.S. PATENT DOCUMENTS

| | | | | |
|---|---|---|---|---|
| 4,376,604 A * | 3/1983 | Pratt et al. | ........................ | 411/34 |
| 4,388,031 A * | 6/1983 | Rodgers | ........................... | 411/43 |
| 4,595,324 A * | 6/1986 | Sadri | .............................. | 411/38 |
| 4,604,033 A * | 8/1986 | Surdi | ......................... | 416/220 R |
| 5,120,175 A * | 6/1992 | Arbegast et al. | .............. | 411/501 |
| 5,123,813 A | 6/1992 | Przytulski et al. | | |
| 5,993,128 A * | 11/1999 | Mark et al. | ........................ | 411/30 |
| 6,910,866 B2 * | 6/2005 | Bassot et al. | ................... | 416/221 |
| 8,113,785 B2 * | 2/2012 | Forgue et al. | .............. | 416/220 R |
| 8,177,465 B2 * | 5/2012 | Brandt et al. | .................... | 411/45 |

FOREIGN PATENT DOCUMENTS

| EP | 0 061 948 A1 | 10/1982 |
|---|---|---|
| EP | 0 165 860 | 12/1985 |
| EP | 1 400 698 A1 | 3/2004 |
| EP | 1 746 250 A1 | 1/2007 |
| EP | 1 873 401 A2 | 1/2008 |
| WO | WO 2008/104413 * | 9/2008 |

OTHER PUBLICATIONS

U.S. Appl. No. 13/310,073, filed Dec. 2, 2011, Delapierre et al.

* cited by examiner

*Primary Examiner* — Edward Look
*Assistant Examiner* — Liam McDowell
(74) *Attorney, Agent, or Firm* — Oblon, Spivak, McClelland, Maier & Neustadt, L.L.P.

(57) ABSTRACT

An anti-wear device of a turbomachine rotor including a disk with a rim and axial recesses machined on the rim for the individual housing of blades; and a ring being fitted to one face of the rim, the ring being pierced with holes in the axial extension of the recesses, is disclosed. At least one of the holes in the extension of the recesses is closed by a plug including a metal head forming a bearing surface for the blades. The plug includes a stud in the extension of the metal head, an insert made of deformable material surrounding at least partly the stud, and a clamping device. The insert is made of deformable material being deformed by the clamping device so as to immobilize the plug in the hole.

14 Claims, 3 Drawing Sheets

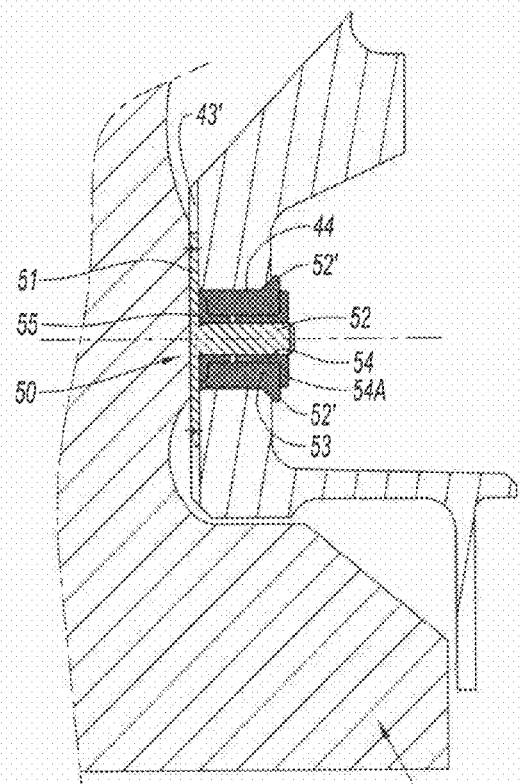
Fig. 4
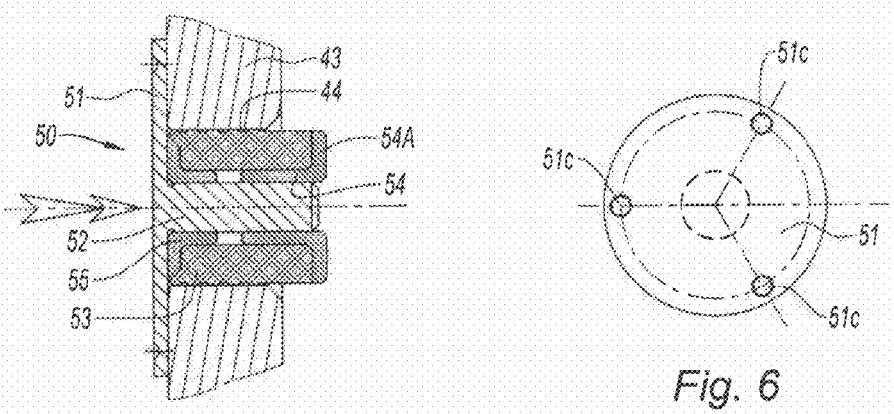
Fig. 5
Fig. 6

ANTI-WEAR DEVICE OF A TURBOMACHINE ROTOR

The present invention relates to the field of gas turbine engines and its particular subject is a turbojet with front fan.

BACKGROUND OF THE INVENTION

The rotor of the turbofan of an engine fitted to civil aircraft comprises a disk driven by the low-pressure shaft and on the periphery of which are held a plurality of blades extending radially by their end forming the root. According to a normal structure, the root of the blades has a dovetail section and the latter are housed in recesses machined into the rim of the disk in a substantially axial direction. Immediately downstream of the fan disk and forming the same rotor is the supercharging compressor. The latter is in the form of a drum and comprises several stages of blades.

DESCRIPTION OF THE PRIOR ART

The fan disk is secured to the drum of the supercharging compressor by being bolted to a radial flange of the latter. The flange is moreover provided with notches forming a means for axial retention of the fan disk blades. Each blade root is provided downstream with an axial extension with two radial grooves and is engaged in a notch of the supercharging compressor flange, mentioned above, at the grooves so as to be locked against any axial movement.

In normal operation, the aerodynamic forces on the blades of the fan have an axial resultant directed upstream. However, when the engine has just been driven in autorotation, the forces on the blades are reversed. Despite the aforementioned axial locking, there is a clearance and a downstream movement of the blades occurs. The portion of the blade forming the stilt between the dovetail root and the platform then presses via its downstream transverse edge against the upstream flange of the supercharging compressor drum. Wear has been found on the upstream face of the flange in the zones situated in the extension of the recesses of the fan disk.

A problem associated with this wear phenomenon arises from the presence, in these zones, of drillings made to relieve the mechanical stresses in the flange. The blade which presses on the flange in a zone with drilling itself sustains erosion. The wear of the stilt is therefore not uniform. The surface of the downstream face of the stilt wears only to the extent that it comes into contact with the flange; the surface portion that is in line with the drilling does not wear and becomes prominent eventually. In addition to this wear phenomenon on the blades, the result is the appearance of clearances between the blades and the flange. These clearances are undesirable because they amplify the wear phenomena on the flange.

The applicant has set itself the objective of producing an anti-wear device which makes it possible to prevent the appearance of these wear zones on the flange upstream of the compressor drum.

The placement of plugs in the relief holes of the upstream flange and forming bearing surfaces for the blades has been examined but the envisaged plastic materials did not ensure a sufficient mechanical strength. Moreover, the use of metal plugs carried a risk of damage to the drum during the plug installation and removal operations made necessary in order to check the material health of the relief holes of the supercharging compressor drum.

SUMMARY OF THE INVENTION

The subject of the invention is therefore an anti-wear device which does not have these drawbacks.

The invention therefore relates to an anti-wear device of a turbomachine rotor comprising a disk with a rim and axial recesses machined on the rim for the individual housing of blades, a ring being fitted to one face of the rim, the ring being pierced with holes of which at least a portion is in the axial extension of the recesses, at least one portion of said holes in the extension of the recesses being closed by a plug comprising a metal head forming a bearing surface for said blades.

The device according to the invention is noteworthy in that the plug comprises a stud in the extension of the metal head, an insert made of deformable material surrounding at least partly the stud and a clamping means, the insert made of deformable material being deformed by the clamping means so as to immobilize the plug in the hole.

This very simply solves this wear problem with a part which has a very low cost and which is easy to apply from one side of the rotor. It is possible to apply this device on both new turbomachines and those already in use.

The use of two materials makes it possible to combine the respective advantages of the latter: the metal portion confers on the plug a good mechanical resistance to the forces exerted by the blade which presses against the metal head and the deformable portion allows the plug to be installed and removed without requiring the use of a heavy tool which would be likely to damage the surface of the rotor.

Moreover, a plug incorporating a clamping means can be produced so as to be installed from only one side of the ring. It has the advantage when the plug is mounted on the flange upstream of a supercharging compressor of preventing the removal of the rotor line.

According to an advantageous embodiment, the plug has at least one of the following characteristics:
  The head is in the form of a disk with a diameter greater than that of the hole. The disk may be circular, oval or else polygonal.
  The material of the deformable insert is an elastomer and forms a sleeve around the stud.
  The external diameter of the insert is sufficient to limit any rotary movement thereof in the hole before application of the clamping means.
  The clamping means comprises a rigid annular element with a collar which is pressed against the insert made of deformable material so as to deform it.
  Said rigid annular element with a collar is mounted on the stud, the clamping being produced by the movement of the annular element along the stud and more particularly the rigid annular element with a collar is threaded and is screwed onto the stud which itself comprises a thread.
  The head of the plug is provided with external markings in order to allow the insertion of a screwing tool and the rotation of the plug about the axis of the hole.

The plug is thus arranged so as not to damage the metal forming the drum. It is put in place by simple and easy operations avoiding contacts between metal parts. During servicing by a technician, it prevents the formation of any start of a crack.

The invention also relates to a plug arranged to form an anti-wear device. The plug is noteworthy in that the head with the stud, the deformable insert and the clamping means are preassembled before installation of the plug on the rotor by insertion from one side of the rotor.

The invention also relates to a compressor rotor of a gas turbine engine, comprising a disk with a rim secured to a ring, the rim of the disk having axial recesses for the housing of blades, the ring covering at least partially the downstream edge of the recesses and comprising stress-relief drillings a portion of which is placed in the axial extension of said recesses, said rotor comprising said anti-wear device.

More particularly, the disk is a fan disk in a turbojet with front fan attached to a low-pressure compressor drum. The ring is secured to the compressor drum and the disk is attached to the drum by being bolted onto the ring. The holes are mechanical stress-relief holes.

The invention applies primarily to a turbojet comprising a front fan and a supercharging compressor downstream of the fan wherein the fan disk and the compressor drum form the rotor of the invention.

BRIEF DESCRIPTION OF THE DRAWINGS

Other features and advantages will emerge from the following description of an embodiment with reference to the appended drawings in which:

FIG. 4 shows in axial half-section a plug according to the invention in place in a drill hole of the upstream flange of the supercharging compressor of an engine;

FIG. 5 shows the plug of the invention on its insertion into the drill hole of FIG. 4 before it is locked;

FIG. 6 shows the plug of the invention seen from the front.

DESCRIPTION OF THE PREFERRED EMBODIMENTS

Figure 1:
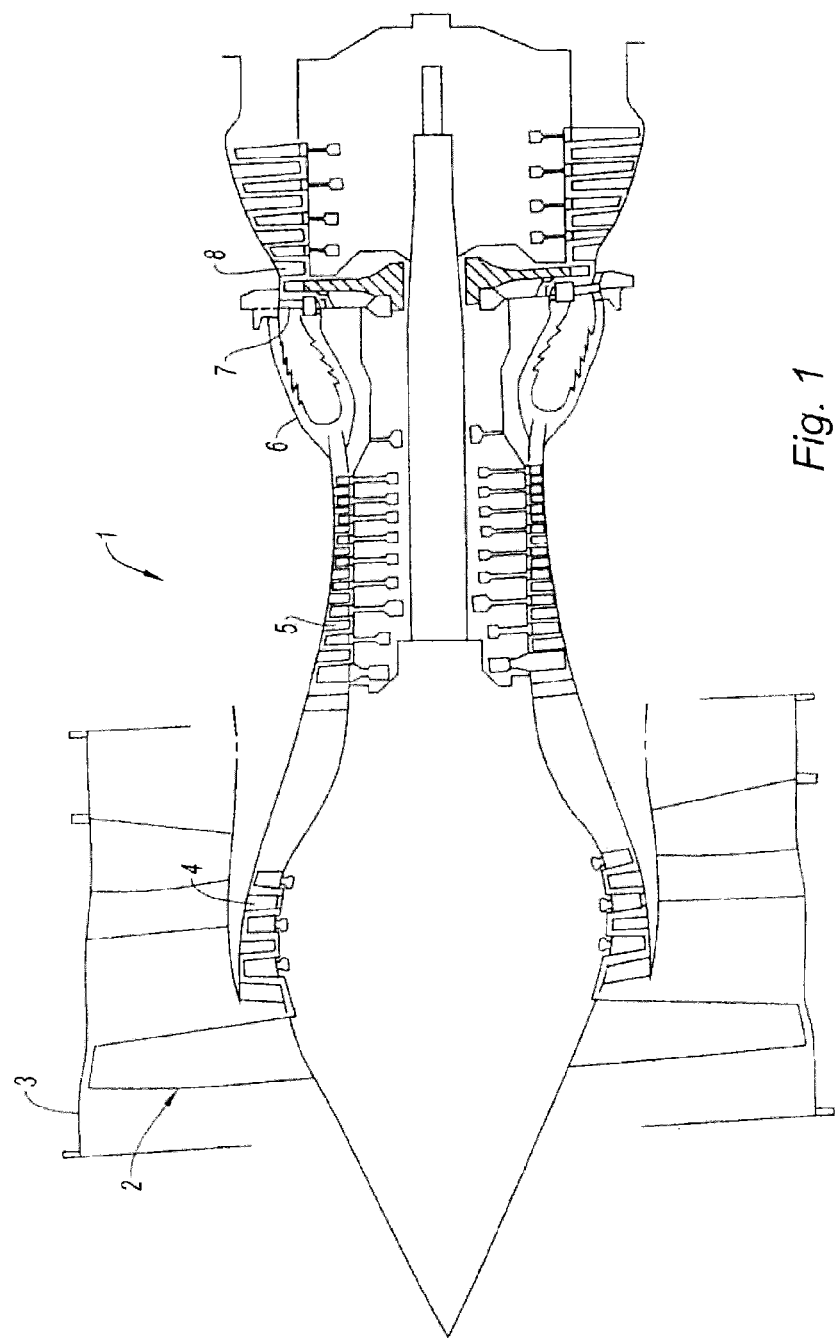
FIG. 1 represents a view in axial section of a turbojet to which the anti-wear device of the invention is applied.

FIG. 1 shows, in axial section, a twin-spool bypass turbojet 1. It comprises upstream a front fan 2 with a streamlined rotor in a fan casing 3 which delimits the stream of bypass air. The rotor of the fan 2 is secured to a low-pressure compressor 4, also called a supercharging compressor. The assembly of the fan 2 and of the supercharging compressor is secured by means of a central shaft to a turbine assembly downstream forming the low-pressure turbine 8.

Downstream of the supercharging compressor 4, the air is again compressed by the high-pressure compressor 5. The latter is secured in rotation to the high-pressure turbine stage 7 by which it is driven. The compressed air enters the combustion chamber 6 which produces the hot gases for driving the turbine stages.

In this example, the invention relates to the portion of the engine situated between the fan rotor 2 and the rotor 4 of the low-pressure compressor.

Figure 2:
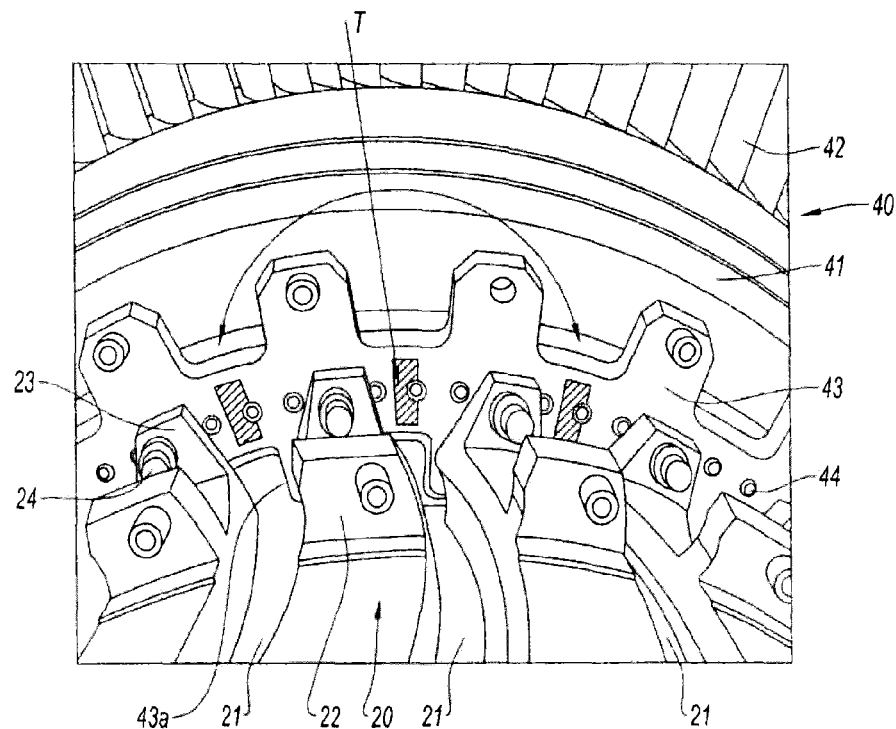
FIG. 2 shows in perspective the detail of a turbojet fan rotor on the side of the upstream flange of the supercharging compressor.

FIG. 2 shows, in perspective and seen from upstream, the inside of this zone in which, for greater clarity, the fan blades have been omitted.

The fan disk 20 comprises, on its rim, recesses 21 oriented generally axially, that is to say in the axis of the engine, with, in this instance, a curvilinear shape. The recesses have a dovetail cross section in order to hold the blades radially. The rim comprises transverse radial flanges 22 between the recesses for the attachment of inter-blade platforms not shown. The disk 20 is secured to the low-pressure compressor 40 called the supercharging compressor, situated downstream. The compressor 40 comprises a cylindrical drum 41 to which the compressor blades 42, which can be partly seen, are attached. Upstream, the drum is secured to a radial transverse flange 43, forming a ring and to which the rim of the disk 20 is bolted. The rim comprises radial attachment flanges 23 between the recesses 21. Each radial flange 23 is attached by a bolt 24 to the upstream flange 43 of the compressor.

The upstream flange 43 has retaining notches 43a with radial edges and which are open toward the axis of the machine. These notches are used to axially retain the blades by insertion of the root of the latter which are housed in the recesses 21 situated opposite. This method of retaining the blades is described in the patent EP 165 860 in the name of the applicant. Between the attachment flanges 23, on the same circle, axial drill holes 44 are made in the upstream flange 43 of the supercharging compressor drum 40. The function of these drill holes is to relieve the mechanical stresses to which this part is subjected. Sealing plugs close off the drill holes and prevent the downstream air, inside the drum cavity, from leaking through the drill holes to the upstream where the pressure is lower. These sealing plugs are made of synthetic material and perform no other function.

In operation, the engine can be set to autorotation with reversal of the forces on the blades. In such a case, the blades press against the flange 43 via the downstream face of their stilt. The pressure and the movements of the blades cause wear both of the blade and of the upstream flange. Indicated on this rotor is the disposition of the traces T of wear left by the stilts of the blades on the flange 43. These traces reproduce the shape of the section of the blade stilts; it is rectangular in shape. They are situated in the extension of the recesses in which the blades are housed and straddle in particular the drill holes 44. This straddling of the bearing zone causes uneven wear of the stilt with hollowing out of the material around the portion which comes in line with the drill hole. Specifically, in the assemblies of the prior art, this portion being in contact only with the plug made of plastic material, does not wear.

The appearance of these zones T is prevented by placing plugs on which the blades will press, sparing the surface of the flange of the drum.

Figure 3:
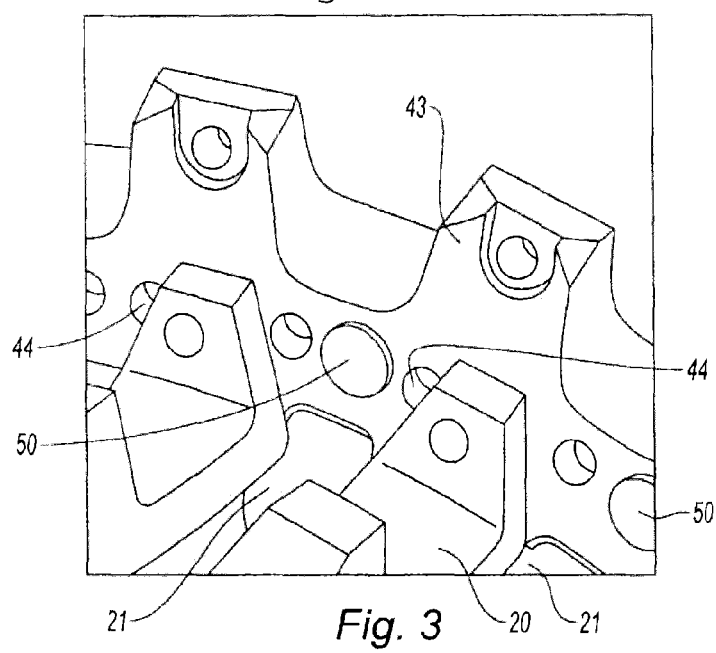
FIG. 3 shows the detail of the flange represented in FIG. 2 with an anti-wear device.

FIG. 3 shows, in perspective, the same zone of the engine as FIG. 2, at another angle but also without the blades. Only a portion of the fan disk 20 is shown. It is associated with the upstream flange 43 of the low-pressure compressor downstream. A plurality of drill holes are shown which are made on the upstream flange 43 and distributed in a circle passing at the level of the bolts for attaching the flanges 23 of the fan disk to the upstream flange 43. Shown in particular is a drill hole which is opposite a recess 21, in its extension, closed by a plug 50. This plug is arranged, according to the invention, in order to form a bearing surface for the blade which is in this recess.

FIGS. 4, 5 and 6 illustrate the solution of the invention.

The plug 50 comprises a head 51 in the form of a circular disk or other form. Its diameter is greater than that of the hole 44 in which it is mounted. The head is extended by a stud 52 in this instance with a length that is greater than the thickness of the flange 43. An insert 53 in the form of a sleeve surrounds the stud 52 and fills the volume between the stud 52 and the inner wall of the hole.

The insert is made of a shape-memory deformable material, that is to say that it resumes its position and its initial shape after removal of the stresses that are applied to it. Advantageously it is made of elastomer and has a shore hardness of between 45 and 80 shore A. It can therefore be deformed in order to ensure the clamping of the plug (hardness<80 shore A) and its deformation under the action of the centrifugal force remains acceptable (hardness>45 shore A). Having shape memory, the elastomer retracts during loosening and thus ensures the removal and reinstallation of the plugs.

An annular element 54 with a collar 54A is interposed between the screw and the insert 53 on the side of the downstream end of the stud. The annular element 54 is internally threaded and is screwed onto the stud 52 which has a matching thread. Another annular element with a collar 55 is interposed between the insert 53 and the stud on the side of the head 51. This annular element 55 is internally smooth.

As can be seen in FIG. 6, which is a front view of the plug 50, the head 51 a also comprises three marks 51c for the insertion of a tool by which it is possible to screw the plug about the axis of the threaded stud.

The plug is mounted as follows.

As can be seen in FIG. 5, the plug 50 is presented before installation with its insert 53 not deformed. The external surface of the insert in the shape of a sleeve is hollowed with transverse grooves and its maximum diameter is slightly greater than that of the hole 44; it is thus installed with a tight fit. The grooves allow the plug to slide into the hole despite the absence of clearance. The length of the plug is greater than the depth of the hole; its distal end therefore protrudes from the hole on the opposite face. Once the head 51 is pressing against the upstream face of the flange 43, as shown in FIG. 5, the plug is locked into the hole.

For this purpose, an appropriate tool with three branches is inserted into the marks 51C made on the surface of the head of the plug. The function of this tool is to turn the plug about its axis. Proceeding in this manner and with the plug being held by the friction forces against the internal wall, the rotation of the stud causes the threaded annular element 54 to advance relative to the stud 52. The annular element is secured to the insert and cannot turn on the latter. The insert deforms progressively until the downstream portion forms a protrusion 52' between the downstream outlet of the hole 44 and the collar 54A of the annular element 54. This protrusion immobilizes the plug.

As can be seen in FIG. 4, the blade A is then installed in its recess and presses against the head 51. In order to ensure a contact of the blade both on the head of the plug and the upstream face of the flange 43, a groove 43' has been machined in the upstream face of the flange 43 to a depth equal to the thickness of the head 51. By protruding from the drill hole 44, the head 51 forms a bearing surface sufficient for the forces to be spread. The strength of the head 51 is also sufficient for the metal not to enter the drill hole.

FIG. 4 also shows that the downstream extension of the root of the blade is housed in a notch 43A of the flange inside which the latter is held axially. The locking grooves cannot be seen in the figure.

When it is necessary to change the plug, it is sufficient to unscrew the head 51 in the opposite direction to that of installation. The annular element then moves clear, releasing the protrusion. The head is unscrewed until the protrusion disappears completely. It is then sufficient to pull the whole of the plug in the axis, in the upstream direction. The elements of the plug remain assembled; this prevents any portion falling on the other side of the upstream flange 43. This solves any problem of access to the other face of the upstream flange.

This solves, via a particularly simple and low-cost means, a problem of wear which was capable of having very harmful consequences to the safety, cost and performance of the engine.

The embodiment shown is nonlimiting; variants enter into the context of the invention. These variants may relate to the sleeve, the way it is installed on the stud, the anti-rotation holding of the sleeve inside the hole while it is tightened or else the tightening means itself which can be carried out in a manner other than by screwing and unscrewing.

The invention claimed is:

1. An anti-wear device of a turbomachine rotor comprising:
a disk with a rim and axial recesses machined on the rim for individually housing blades; and
a ring fitted to one face of the rim, the ring being pierced with holes in an axial extension of the recesses, at least one of said holes in the axial extension of the recesses being closed by a plug comprising a metal head forming a bearing surface for said blades,
wherein the plug comprises
a stud extending from the metal head,
an insert made of deformable material surrounding at least partly the stud and
a rigid annular element with a collar, the rigid annular element being interposed between the stud and the insert at a downstream end of the stud opposite the metal head,
wherein an axial length of the insert and an axial length of the rigid annular element are greater than an axial length of the at least one of said holes, and
wherein the insert made of deformable material is deformed by the collar of the rigid annular element so as to present a protrusion formed between a downstream outlet of the hole and the collar of the rigid annular element so as to immobilize the plug in the at least one of said holes.

2. The anti-wear device as claimed in claim 1, wherein the head is a disk with a diameter greater than a diameter of the at least one of said holes.

3. The anti-wear device as claimed in claim 1, wherein the insert made of deformable material forms a sleeve around the stud.

4. The anti-wear device as claimed in claim 3, wherein an external diameter of the insert is sufficient to limit any rotation of the deformable sleeve in the at least one of said holes before application of the rigid annular element.

5. The anti-wear device as claimed in claim 1, wherein the insert is a shape-memory deformable material.

6. The anti-wear device as claimed in claim 5, wherein the insert is an elastomer with a hardness of between 45 and 80 shore A.

7. The anti-wear device as claimed in claim 1, wherein the rigid annular element is screwed onto the stud.

8. The anti-wear device as claimed in claim 1, wherein the head of the plug is provided with external markings in order to allow the insertion of a screwing tool and the rotation of the plug about the axis of the hole.

9. The anti-wear device as claimed in claim 1, wherein another annular element with a collar is interposed between the insert and the stud at an upstream end of the stud.

10. An anti-wear plug of a turbomachine rotor comprising:
a metal head in the form of a disk forming a bearing surface for blades of said turbomachine,
a stud extending from the metal head;
an insert made of shape-memory deformable material forming a sleeve around the stud; and
a clamping rigid annular element with a collar, the collar being pressed against the insert made of deformable material and capable of deforming the insert by being screwed onto the stud so that the collar of the annular element deforms the insert to form a protrusion of the insert,
wherein the metal head comprises markings for insertion of a tool for screwing the plug about the stud.

11. A compressor rotor of a gas turbine engine, including an anti-wear device comprising:

a disk with a rim and axial recesses machined on the rim for individually housing blades; and a ring fitted to one face of the rim, the ring being pierced with holes in an axial extension of the recesses, at least one of said holes in the axial extension of the recesses being closed by a plug comprising a metal head forming a bearing surface for said blades, wherein the plug comprises
- a stud extending from the metal head,
- an insert made of deformable material surrounding at least partly the stud, and
- a rigid annular element with a collar, the rigid annular element being interposed between the stud and the insert at a downstream end of the stud opposite the metal head, wherein an axial length of the insert and an axial length of the rigid annular element are greater than an axial length of the at least one of said holes, and wherein the insert made of deformable material is deformed by the collar of the rigid annular element so as to present a protrusion formed between a downstream outlet of the hole and the collar of the rigid annular element so as to immobilize the plug in the at least one of said holes.

12. The rotor as claimed in claim 11, wherein the disk is a fan disk in a turbojet with a front fan attached to a low-pressure compressor drum.

13. The rotor as claimed in claim 12, wherein the ring is secured to the compressor drum and the disk is attached to the drum by being bolted onto the ring, and wherein the holes are stress-relief holes.

14. A turbojet comprising:
a front fan; and
a supercharging compressor downstream of the fan,
wherein the fan disk and the compressor drum form a rotor as claimed in claim 11.

* * * * *